United States Patent [19]

Makhlouf et al.

[11] Patent Number: 5,470,886
[45] Date of Patent: Nov. 28, 1995

[54] CURABLE, SPRAYABLE COMPOSITIONS FOR REINFORCED THIN RIGID PLATES

[75] Inventors: Joseph M. Makhlouf, Mars; John R. Schneider, Glenshaw, both of Pa.

[73] Assignee: PPG Industries, Inc., Pittsburgh, Pa.

[21] Appl. No.: 220,656

[22] Filed: Mar. 31, 1994

[51] Int. Cl.$^6$ ............... C08K 9/10; C08K 7/02; C08L 63/02; C08L 63/00
[52] U.S. Cl. ............... 521/59; 523/206; 523/218
[58] Field of Search ............... 521/59; 523/218, 523/206

[56] References Cited

U.S. PATENT DOCUMENTS

| | | | |
|---|---|---|---|
| 3,960,785 | 6/1976 | Babcock | 523/218 |
| 4,005,033 | 1/1977 | Georgeau et al. | 260/2.5 B |
| 4,077,921 | 3/1978 | Sharpe et al. | 260/2.5 B |
| 4,528,305 | 7/1985 | Henry | 523/219 |
| 4,739,019 | 4/1988 | Schappert et al. | 525/438 |
| 4,751,129 | 6/1988 | Ramalingam et al. | 428/195 |
| 5,009,810 | 4/1991 | Wason | 521/59 |
| 5,151,327 | 9/1992 | Nishiyama et al. | 428/343 |
| 5,155,138 | 10/1992 | Lundqvist | 521/76 |

FOREIGN PATENT DOCUMENTS

| | | |
|---|---|---|
| MI93A0636 | 9/1994 | Italy . |
| 1115247 | 5/1968 | United Kingdom . |
| WO89/08678 | 9/1989 | WIPO . |

OTHER PUBLICATIONS

Lee et al., "Handbook of Epoxy Resins", McGraw–Hill Book Co., New York, pp. 5/14–5/15 and 14/4.

Cotton et al., *Advanced Inorganic Chemistry, A Comprehensive Text*, 4th ed., 1980, pp. 300–301.

Hawley, G., ed. *The Condensed Chemical Dictionary*, 8th ed., 1971, p. 289.

Nobel Industries Sweden, Technical Bulletin No. 21, Sep. 1989.

*Primary Examiner*—John C. Bleutoe
*Assistant Examiner*—D. R. Wilson
*Attorney, Agent, or Firm*—Kenneth L. Stachel; William J. Uhl

[57] ABSTRACT

A curable, sprayable composition suitable for reinforcing thin rigid plates or sheets such as are used in the assembly of automobiles is provided. The composition comprises a thermosetting resin, expandable microspheres and a particulate reinforcing material selected from the group consisting of milled glass fibers, milled carbon fibers and mixtures thereof.

12 Claims, No Drawings

CURABLE, SPRAYABLE COMPOSITIONS FOR REINFORCED THIN RIGID PLATES

FIELD OF THE INVENTION

The present invention relates to sprayable, curable compositions and their use for reinforcing thin rigid plates or sheets, and to the reinforced plate or sheet itself.

BACKGROUND OF THE INVENTION

The use of thin gauge rigid plates or sheets in automobile manufacture has been greatly accelerated due to improved corrosion protection, lighter weight, easy formability and lower cost. This practice has left certain parts of a car more vulnerable to easy denting and damage. Historically, either a reinforcing plate is welded or bonded to these areas, or a precut patch of epoxy impregnated glass fibers is attached.

Reinforcing compositions prepared from thermosetting resins, particularly epoxy resins, used to reinforce thin rigid sheets used in automobiles exhibit a number of advantages including strength, adhesion, and corrosion resistance. One distinct disadvantage is that many thermosetting resins, particularly epoxy based compositions, deform the substrates to which they bond due to shrinkage during curing.

In the automobile industry this deformation is of particular concern where the appearance of the substrate is critical. This substrate deformation necessitates additional costs in labor and materials in order to restore the intended appearance of the substrate.

U.S. Pat. No. 5,151,327 discloses an adhesive sheet for reinforcing thin rigid plates. Such adhesive sheets comprise several resinous layers and need to undergo a sizing treatment before application to the thin rigid plates. The adhesive sheets contain foaming agents to prevent shrinkage during cure. Application is by lamination.

U.S. Pat. No. 4,739,019 discloses an adhesive composition for use in automotive applications. This composition contains an epoxide and a thermoplastic polyester. Such a composition loses its strength when heated to curing temperatures because the viscosity of the thermoplastic polyester decreases, and when applied to the underside of a substrate, the composition tends to sag or fall off the substrate during heating.

U.S. Pat. No. 5,155,138 discloses the use of expandable thermoplastic microspheres in polymers and paints. It is also known to use expandable microspheres in car underbody coatings and sealants. (See Nobel Industries Technical Bulletin no. 21). There is no teaching of the use of such microspheres in thin panel reinforcing compositions.

It is desirable to develop a curable thermosetting composition, preferably sprayable for convenient application, which when used to reinforce thin rigid plates used in automobile manufacture exhibits excellent physical properties and reduced shrinkage.

SUMMARY OF THE INVENTION

In accordance with the present invention there is provided a curable, sprayable composition comprising: (i) a thermosetting resinous composition; (ii) expandable microspheres; and (iii) a particulate reinforcing material selected from the group consisting of milled glass fibers, milled carbon fibers, and mixtures thereof.

The present invention also provides a method of reinforcing thin rigid plates comprising applying the composition described above to one side of a rigid plate, followed by curing the composition, and to the reinforced rigid plate itself comprising a rigid plate and the cured composition described above primarily adhered to one side of the rigid plate.

DETAILED DESCRIPTION

Examples of the thermosetting resin used in the composition of the present invention include various kinds of epoxy resins, such as glycidyl ethers, glycidyl esters, glycidyl amines, linear-aliphatic epoxides and alicyclic epoxides, and modified epoxy resins derived therefrom..

The preferred epoxy-based materials in the composition of the present invention contain at least two 1,2-epoxide groups per molecule. These materials are also referred to as polyepoxides. In general, the epoxy equivalent weight can range from about 140 to about 750. These polyepoxides may be saturated or unsaturated, cyclic or acyclic, aliphatic, alicyclic, aromatic, or heterocyclic. They may contain substituents such as halogens, hydroxyl groups, and ether groups.

Suitable classes of polyepoxides include epoxy ethers obtained by reacting an epihalohydrin such as epichlorohydrin with a polyphenol in the presence of an alkali. Suitable polyphenols include resorcinol, catechol, hydroquinone, bis(4-hydroxyphenyl)-2,2-propane (i.e., Bisphenol A), bis(4-hydroxyphenyl)-1,1-isobutane, bis(4-hydroxyphenyl)-1,1-ethane, bis(2-hydroxyphenyl)-methane, 4,4-dihydroxybenzophenone, and 1,5-dihydroxynaphthalene. The polyglycidyl ether, particularly the diglycidyl ether, of Bisphenol A is preferred.

Other suitable polyepoxides include polyglycidyl ethers of polyhydric alcohols. These compounds may be derived from polyhydric alcohols such as ethylene glycol, propylene glycol, butylene glycol, 1,6-hexylene glycol, neopentyl glycol, diethylene glycol, glycerol, trimethylol propane, and pentaerythritol. These compounds may also be derived from polymeric polyols such as polypropylene glycol and hydroxyl functional polyesters.

Examples of other suitable polyepoxides include polyglycidyl esters of polycarboxylic acids. These compounds may be formed by reacting epichlorohydrin or another epoxy material with an aliphatic or aromatic polycarboxylic acid such as succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid. Dimerized unsaturated fatty acids containing about 36 carbon atoms (Dimer Acid) may also be used in the formation of these polyglycidyl esters of polycarboxylic acids. Preferred are epoxy-terminated adducts of dimer fatty acids and epoxy-terminated adducts of polyesters containing sebacic, azelaic, and/or dodecanedioic acids.

Other suitable polyepoxides include epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate.

The polyepoxides can be partially defunctionalized by carboxylic acids, alcohol, water, phenols, mercaptans, or other active hydrogen-containing compounds to yield hydroxyl-containing polyepoxides if desired.

Although the curable composition usually comprises a mixture of two or more epoxide group-containing materials selected from the group consisting of diglycidyl ether of Bisphenol A, diglycidyl ether of polypropylene glycol, and glycidyl ether-terminated adducts of diepoxides and diacid-containing moieties, monoepoxides can be used to modify the viscosity of the composition and modulate the rate of cure.

Typically, the curable composition of the present invention contains from about 40 to about 80 percent of epoxide group-containing material(s), preferably from about 50 to 65 percent, based upon total weight of the composition.

The expandable microspheres in the composition of the present invention usually comprise a thermoplastic polymeric shell containing a volatile liquid propellant. Upon heating to a temperature above the softening point of the polymer and the boiling point of the propellant, the spheres expand to as much as five times their original diameter. The polymeric shell may be a polymer or copolymer of, for example, vinyl chloride, vinylidene chloride, acrylonitrile, methyl methacrylate, styrene, or mixtures thereof. Suitable propellants include freons, such as trichlorofluoromethane, hydrocarbons, such as n-pentane, isopentane, neopentane, butane, isobutane, or other conventional propellants.

The expandable microspheres prevent shrinkage of the composition during cure, allowing the substrate to which the composition is applied to retain its surface shape and appearance. When the curable composition is applied to the under surface of a substrate and cured, the expandable microspheres are advantageous in that they do not cause the composition to fall or blow off the substrate, unlike foaming agents. The foaming action of foaming agents is often forceful enough to blow a reinforcing composition off the underside of a substrate during cure.

Expandable microspheres such as those described in U.S. Pat. Nos. 4,005,033 and 5,155,138 are suitable for use in the composition of the present invention. Particularly preferred expandable microspheres are available from Casco Nobel AB under the name EXPANCEL.

The expandable microspheres are present in an amount ranging from 1 to 7 percent by weight, preferably 2 to 5 percent by weight, based upon total weight of the composition.

The particulate reinforcing agent in the composition of the present invention may be milled glass fibers, milled carbon fibers, or mixtures thereof. The milled fibers are typically about 1/16 inch (1.59 mm) in length. The reinforcing agent is present in an amount ranging from 8 to 40 percent by weight, preferably 15 to 30 percent by weight, based upon total weight of the composition.

The composition of the present invention may also contain a latent crosslinking agent such as boron trifluoride monoethylamine complex, boron trifluoride diethylamine complex, boron trifluoride triethylamine complex, boron trifluoride pyridine complex, boron trifluoride benzyldimethylamine complex, boron trifluoride benzylamine, and boron trifluoride etherate. By latent is meant that these materials are inactive until the application of heat. Mixtures of crosslinking agents may also be used.

The crosslinking agent is typically present in an amount ranging from about 1 to about 13 percent by weight, preferably from about 3 to about 8 percent by weight, based upon total weight of the curable composition.

The curable composition of the present invention may also contain one or more catalysts that are capable of initiating epoxy cure at moderate temperatures. Typically these are dihydrazides of dibasic acids such as adipic and sebacic acids. Sebacic dihydrazide is the preferred catalyst. Other suitable catalysts include dicyandiamide and the reaction product of (i) an organic polyisocyanate, preferably a diisocyanate, with a diamine containing a primary or secondary amine group and a tertiary amine group, and (ii) an acid functional compound, preferably a polyphenol. The equivalent ratio of polyisocyanate to diamine to acid functional compound is generally about 1:1:3 to 1:1:4. The adduct of isophorone diisocyanate and dimethylaminopropyl amine and Bisphenol A is preferred.

The catalysts, when present, are typically present in an amount ranging from about 0.5 to about 5 percent by weight, preferably from about 1 to about 2.5 percent by weight, based upon total weight of the curable composition.

The curable composition of the present invention may also contain a variety of optional additives including pigments such as carbon black, fillers such as calcium oxide, aluminum powder, and wollastonite, and thixotropes such as bentonire clay. The composition may be prepared as a one-package composition.

The optional additives, when present, are typically present in an amount ranging from about 5 to about 30 percent by weight, preferably from about 10 to about 20 percent by weight, based upon total weight of the curable composition.

The substrates to which the curable compositions of the present invention are generally applied may be thin rigid sheets or plates such as thin metal plates including steel plates, aluminum plates, copper plates, and stainless steel plates, and thin plastic plates such as fiberglass reinforced polyester plates, and other plastic plates. Steel plates are preferred. The thin metal rigid plates or sheets generally have a thickness of about 0.3 to 2 mm.

The curable composition of the present invention may be applied to the substrate in a number of ways including spraying, extrusion, or by hand with a blade. Spraying is the preferred method of application because of ease of application and consistent thickness of the applied layer. The applied layer generally has a thickness of about 40 to 240 mils (1 to 6 mm) before curing and 80 to 360 mils (2 to 9 mm) after curing.

The composition is typically cured by heating to a temperature of about 300° F. to about 375° F., preferably about 325° F. for a period ranging from about 20 minutes to 1 hour.

The curable composition of the present invention is preferably used in a method for reinforcing thin rigid plates or sheets. Such a method would comprise applying the composition to the thin rigid plate or sheet as described above and curing the composition while it is in contact with only the rigid plate or sheet. When Used to reinforce a thin rigid plate or sheet, the composition is applied to one side of the plate or sheet and is adhered to no other surface; that is, it is not serving as an adhesive composition. In hemmed fixtures, upon expansion during cure the composition may touch and adhere to another surface. This is incidental, however.

The invention will further be described by reference to the following examples. Unless otherwise indicated, all parts are by weight.

The following examples (1 to 4) illustrate the effect of fiber reinforcement and expandable microspheres on flexural strength and readthrough.

Reinforcing compositions were prepared from the following mixture of ingredients:

| Example: | 1 | 2 | 3 | 4 |
|---|---|---|---|---|
| Ingredient: | | | | |
| EPON 828[1] | 39.4 | 39.4 | 39.4 | 39.4 |
| Epoxy ester[2] | 8.12 | 8.12 | 8.12 | 8.12 |
| EPON Dimer acid[3] | 4.06 | 4.06 | 4.06 | 4.06 |
| CARDOLITE NC-513[4] | 4.06 | 4.06 | 4.06 | 4.06 |
| BENTONE 27[5] | 4.87 | 4.87 | 4.87 | 4.87 |
| CABOSIL TS-720[6] | 0.61 | 0.61 | 0.61 | 0.61 |
| Dicyandiamide | 3.05 | 3.05 | 3.05 | 3.05 |
| Sebacic dihydrazide | 0.81 | 0.81 | 0.81 | 0.81 |
| Milled glass fiber[7] | 16.25 | — | 8.125 | 8.125 |
| Milled carbon fiber[8] | — | 16.25 | 8.125 | 8.125 |
| Calcium oxide | 2.44 | 2.44 | 2.44 | 2.44 |
| VANSIL W-10[9] | 11.78 | 11.78 | 11.78 | 11.78 |
| EXPANCEL 051 DU[10] | 2.84 | 2.84 | 2.84 | — |
| EXPANCEL 091 DU[11] | 0.81 | 0.81 | 0.81 | — |
| Carbon black | 0.08 | 0.08 | 0.08 | 0.08 |
| Catalyst[12] | 0.81 | 0.81 | 0.81 | 0.81 |

[1]Polyglycidyl ether of Bisphenol A, available from Shell Oil and Chemical Co.
[2]Diglycidyl ether polyester formed from reacting a carboxylic acid terminated polyester (Diethylene sebacate dodecanedioate) with an excess of EPON 828.
[3]Adduct of Dimer Fatty acid and EPON 828 in a 1 to 5 mole ratio.
[4]Cashew oil-derived monoepoxide available from Cardolite Corporation.
[5]Thixotropic clay, available from NL Industries.
[6]Hydrophobic fumed silica, available from Cabot Corporation.
[7]Available as 739DD from Owens-Corning Fiberglas Corp.
[8]Available as PANEX MF33 from Zoltek Corp., Carbon and Graphite Div.
[9]Wollastonite clay available from R. T. Vanderbilt Co., Inc.
[10,11]Expandable microspheres, available from Nobel Industries.
[12]Adduct of dimethylaminopropyl amine and isophorone diisocyanate and Bisphenol A in an equivalent ratio of about 1:1:3.75.

BENTONE 27 was premixed with EPON 828 and heated to about 100° C. Under shear mixing, the epoxy ester, EPON-dimer acid adduct and the CARDOLITE NC-513 were added. With the exception of the dicyandiamide, sebacic dihydrazide, and catalyst (12), the other ingredients were then added in order under a high rate of shear. The mixture was cooled to less than 35° C. and the catalysts were added under a moderate amount of shear. The mixture was degassed under reduced pressure using gentle mixing.

The compositions of Examples 1 to 4 were evaluated for deflection, readthrough, and flexural strength as follows:

1) Deflection: A film of about 50 mils (1.27 mm) in thickness and 1 inch (2.54 cm) in width of the composition was drawn onto a flat, oiled 1×6 inch (2.54×15.24 cm) strip of metal. The strip was placed in an oven at 325° to 350° F. (163° to 177° C.) for 20 to 30 minutes. The strip was cooled to ambient temperature and placed on a flat surface. Then one end of the strip was pressed down and the distance that the other end lifted from the horizontal was measured.

2) Readthrough: A film of about 50 mils (1.27 mm) of the composition about 2 inches (5.08 cm) in length and 1 inch (2.54 cm) in width was drawn onto a 4×12 inch (10.16×30.48 cm) strip of metal. The strip was placed in an oven at 325° to 350° F. (163° to 177° C.) for 20 to 30 minutes. The strip was cooled to ambient temperature and observed at eye level to assess the occurrence of wrinkling above the cured coating. The strip was further coated with glossy black paint if necessary to aid visibility of any wrinkling. A rating was assigned from 0 ("perfect") to 5 ("worst").

3) Flexural strength: A 1×6 inch (2.54×15.24 cm) strip was prepared as for the Deflection test above and then placed in a jig on an Instron machine so that the edges were supported on each end while a blunt wedge was positioned in the middle, nearly touching the metal. On activation, the wedge flexed the reinforced metal until failure of the coating. The maximum load needed to induce failure was recorded.

The results are reported in Table I below:

TABLE I

| Example: | 1 | 2 | 3 | 4 |
|---|---|---|---|---|
| Property: | | | | |
| Viscosity 0.5 rpm[1] | 762,808 | 1,113,542 | 1,066,358 | 902,787 |
| Viscosity 1.0 rpm | 472,626 | 747,080 | 676,304 | 582,722 |
| Thixotropic ratio[2] | 1.61 | 1.5 | 1.58 | 1.55 |
| Deflection, inches (mm) | 0.098 (2.49) | 0.048 (1.22) | 0.20 (5.04) | 0.85 (21.59) |
| Flexural strength, pounds, (kg) room temperature | 13 (28.6) | 24 (52.8) | 15.5 (34.1) | 20.5 (45.1) |
| Flexural strength, 180° F. (82.8° C.) | 14.5 (31.9) | 22.5 (49.5) | 17.5 (38.5) | 23 (50.6) |
| Readthrough rating | 1–1.5 | 2–2.5 | 1 | 4.5 |
| Metal thickness, mils (mm) | 32 (0.81) | 32 (0.81) | 32 (0.81) | 32 (0.81) |
| Cured coating thickness, inches (mm) | 0.148 (3.76) | 0.148 (3.76) | 0.163 (4.14) | 0.053 (1.35) |

[1]Measured with a Brookfield cone and plate viscometer, expressed in centipoise.
[2]Ratio of viscosity at 0.5 rpm to viscosity at 1.0 rpm.

The following examples (5 to 8) show the importance of milled fibers for strength, surface integrity, and sag resistance during cure.

Reinforcing compositions were prepared as in Examples 1 to 4 from the following ingredients:

| Example: | 5 | 6 | 7 | 8 |
|---|---|---|---|---|
| Ingredient: | | | | |
| EPON 828 | 39.4 | 39.4 | 39.4 | 39.4 |
| Epoxy ester | 8.12 | 8.12 | 8.12 | 8.12 |
| EPON Dimer acid | 4.06 | 4.06 | 4.06 | 4.06 |
| CARDOLITE NC-51 | 4.06 | 4.06 | 4.06 | 4.06 |
| BENTONE 27 | 4.87 | 4.87 | 4.87 | 4.87 |
| CABOSIL TS-720 | 0.61 | 0.61 | 0.61 | 0.61 |
| Dicyandiamide | 3.05 | 3.05 | 3.05 | 3.05 |
| Sebacic dihydrazide | 0.81 | 0.81 | 0.81 | 0.81 |
| Milled glass fiber | — | 16.25 | 8.2 | 16.25 |
| Milled carbon fiber | — | — | 8.2 | — |
| Calcium oxide | 2.44 | 2.44 | 2.44 | 2.44 |
| VANSIL W-10 | 28 | 11.78 | 11.78 | 11.78 |
| EXPANCEL 051 DU | 2.84 | — | — | — |
| EXPANCEL 091 DU | 0.81 | — | — | — |
| Carbon black | 0.08 | 0.08 | 0.08 | 0.08 |
| Catalyst[1] | 0.81 | 0.81 | 0.81 | 0.81 |
| CELLOGEN 754[2] | — | — | — | 1.0 |

[1]Adduct of dimethylaminopropyl amine and isophorone diisocyanate and Bisphenol A, as described in Examples 1–4.
[2]Azide blowing agent available from Uniroyal Chemical Co., Inc.

Results of testing are reported in Table II below:

TABLE II

| Example: | 5 | 6 | 7 | 8 |
| --- | --- | --- | --- | --- |
| Property: | | | | |
| Deflection, inches | 0.112 | 0.222 | 0.111 | 0.069 |
| (mm) | (2.84) | (5.68) | (2.84) | (1.75) |
| Cured coating | 0.091 | 0.048 | 0.046 | 0.079 |
| thickness, inches | (2.31) | (1.22) | (1.17) | (2.01) |
| (mm) | | | | |
| Flexural strength, | 10.5 | 21.7 | 22 | 16 |
| pounds (kg), | (23.1) | (47.7) | (48.4) | (35.2) |
| room temperature | | | | |
| Cured coating | 0.100 | 0.045 | 0.051 | 0.083 |
| thickness, inches | (2.54) | (1.14) | (1.30) | (2.11) |
| (mm) | | | | |
| Flexural strength, | 13.5 | 19.3 | 19.2 | 14.7 |
| 180° F. (82.8° C.) | (29.7) | (42.5) | (42.5) | (32.3) |
| Surface appearance | cracks, hole | smooth | smooth | bubbles, holes |
| Readthrough rating | 1–1.5 | 2–2.5 | 1 | 4.5 |
| Sag resistance[1.] | delamination | good | good | sag |

[1]The uncured coating is spray applied to a metal panel which is placed in an oven at a 45° angle with the coating facing the oven floor. Sagging or displacement or any delamination is noted.

We claim:

1. A curable, sprayable composition comprising:
   (i) a thermosetting resinous composition comprising an epoxy-based material containing at least two epoxide groups per molecule and a catalyst to initiate cure of the epoxy-based material;
   (ii) from about 1 to about 7 percent by weight based upon the total weight of the composition of expandable microspheres which expand during curing of the composition so that the composition with expanded microspheres overcomes deformation of the substrate to which the composition is applied, wherein said deformation is due to shrinkage, and wherein the composition does not fall or blow off the substrate during curing; and
   (iii) from about 8 to about 40 weight percent based upon total weight of the composition of a particulate reinforcing material selected from the group consisting of milled glass fibers, milled carbon fibers, and mixtures thereof.

2. The curable composition of claim 1 wherein the epoxy-based material comprises a polyglycidyl ether of Bisphenol A.

3. The curable composition of claim 1 wherein the epoxy-based material comprises a mixture of two or more epoxy-based materials selected from the group consisting of polyglycidyl esters of acids and polyglycidyl esters of polycarboxylic acids.

4. The curable composition of claim 1 wherein the catalyst is selected from the group consisting of dicyandiamide and dihydrazides of dibasic acids.

5. The curable composition of claim 1 wherein the epoxy-based material is present in an amount ranging from 50 to 65 percent by weight based upon total weight of the composition.

6. The curable composition of claim 1 wherein the catalyst is present in an amount ranging from 0.5 to 5 percent by weight based upon total weight of the composition.

7. The curable composition of claim 1 wherein the expandable microspheres comprise thermoplastic polymeric shells containing a volatile liquid propellant.

8. The curable composition of claim 1 wherein the expandable microspheres are present in an amount ranging from 2 to 5 percent by weight based upon total weight of the composition.

9. The curable composition of claim 1 wherein the particulate reinforcing material is about 1/16 inch (1.59 mm) in length.

10. The curable composition of claim 1 wherein the particulate reinforcing material is present in an amount ranging from 15 to 30 percent by weight based upon total weight of the composition.

11. The curable composition of claim 1 wherein the epoxy-based material is present in an amount ranging from about 40 to about 80 percent by weight based upon total weight of the composition.

12. A curable, sprayable composition comprising:
    (i) a thermosetting resinous composition comprising an epoxy-based material containing at least two epoxide groups per molecule wherein the epoxy-based material is present in an amount ranging from 50 to 65 percent by weight based upon total weight of the curable composition, and a catalyst to initiate cure of the epoxy-based material;
    (ii) expandable microspheres comprising thermoplastic polymeric shells containing a volatile liquid propellant, wherein the expandable microspheres are present in an amount ranging from 2 to 5 percent by weight based upon total weight of the curable composition; and
    (iii) a particulate reinforcing material selected from the group consisting of milled glass fibers, milled carbon fibers, and mixtures thereof, wherein the particulate reinforcing material is present in an amount ranging from 15 to 30 percent by weight based upon total weight of the curable composition.

* * * * *